(12) United States Patent
Szucs et al.

(10) Patent No.: US 8,640,867 B2
(45) Date of Patent: Feb. 4, 2014

(54) MOBILE DEVICE VESSEL

(76) Inventors: Peter Szucs, Los Angeles, CA (US); Anthony Ko, Arcadia, CA (US); Danny Wen, Irvine, CA (US)

(*) Notice: Subject to any disclaimer, the term of this patent is extended or adjusted under 35 U.S.C. 154(b) by 0 days.

(21) Appl. No.: 13/216,220

(22) Filed: Aug. 23, 2011

(65) Prior Publication Data

US 2012/0043236 A1  Feb. 23, 2012

Related U.S. Application Data

(60) Provisional application No. 61/376,232, filed on Aug. 23, 2010.

(51) Int. Cl.
*B65D 85/00* (2006.01)
(52) U.S. Cl.
USPC .............. 206/320; 361/679.58; 220/668
(58) Field of Classification Search
USPC .............. 206/320, 1.5, 586, 305; 220/668; 361/679.26, 679.56, 679.55, 679.3, 361/679.4, 679.01–679.03, 679.58; 312/223.1, 223.2, 223.4
See application file for complete search history.

(56) References Cited

U.S. PATENT DOCUMENTS

| | | | | |
|---|---|---|---|---|
| 6,560,098 B1 * | 5/2003 | Beinor et al. | ............ | 361/679.39 |
| 8,068,332 B2 * | 11/2011 | Yang et al. | ............... | 361/679.01 |
| 8,246,129 B2 * | 8/2012 | Wang et al. | ................ | 312/332.1 |
| 8,342,325 B2 * | 1/2013 | Rayner | ......................... | 206/320 |
| 2010/0203931 A1 * | 8/2010 | Hynecek et al. | ............ | 455/575.8 |

* cited by examiner

*Primary Examiner* — Andrew Perreault
(74) *Attorney, Agent, or Firm* — Kainoa Asuega; One LLP

(57) ABSTRACT

A protective and decorative casing for handheld devices such as a cellular phone, mobile computing device, or portable digital media player. The casing comprises a device stand. The casing expands to allow insertion of the handheld device. The casing has an accessory storage area.

5 Claims, 7 Drawing Sheets

MOBILE DEVICE VESSEL

CROSS REFERENCE TO RELATED APPLICATIONS

This application is based on and claims the benefit of the filing of U.S. Provisional Patent Application No. 61/376,232, filed Aug. 23, 2010, the contents and disclosure of which are fully incorporated herein by reference.

BACKGROUND OF THE INVENTION

The invention relates to protective and decorative casings for handheld devices such as a cellular phone, mobile computing device, or portable digital media player. Conventional protective casings comprise of hard material that engage onto the mobile device via a friction fit where it is mated into place in multiple pieces or around the contour of the device. This conventional method may often times provide simple attachment and removal of the case, but differences in manufacturing tolerances of the case and the device cause a noticeable amount of backlash allowing the mobile device to shift within its protective case.

Designer toys is a term used to describe toys and other collectibles that are produced in limited editions (as few as 10 or as many as 2000 pieces) in various forms ranging from stylized animals to anthropomorphic forms. The toys range in size from around 2 inches to 20 inch tall figures. Materials used to create these collectables are most commonly ABS plastic and vinyl, though wood, metal, and resin are occasionally used. In most instances, these vinyl toys provide no utility and are used for display purposes.

Mobile device stands provide the user the ability to prop their device upright allowing for hands free viewing of media. Most of the current stands in the market are little more than just bent pieces of metal or cut plastic.

BRIEF SUMMARY OF THE INVENTION

The objective of this invention is to enhance convenience of removal and attachment of a protective case to a device as well as provide an improved fit by significantly reducing play. Both issues are addressed through the utilization of a mechanism similar to a clasp, buckle, or lever actuated cam lock to tighten the protective case around the cellular phone or related device. The invention comprises of a protective material to shield a mobile device from damage and a mechanism to eliminate play.

This invention combines the styling and design of vinyl toys with the utility of mobile device stands. In the case of a smart phone such as the iPhone 4, an application can be designed to replace the facial features of the toy providing an electronic representation that provides alerts and responds to music being played on the device.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

Figure 6:
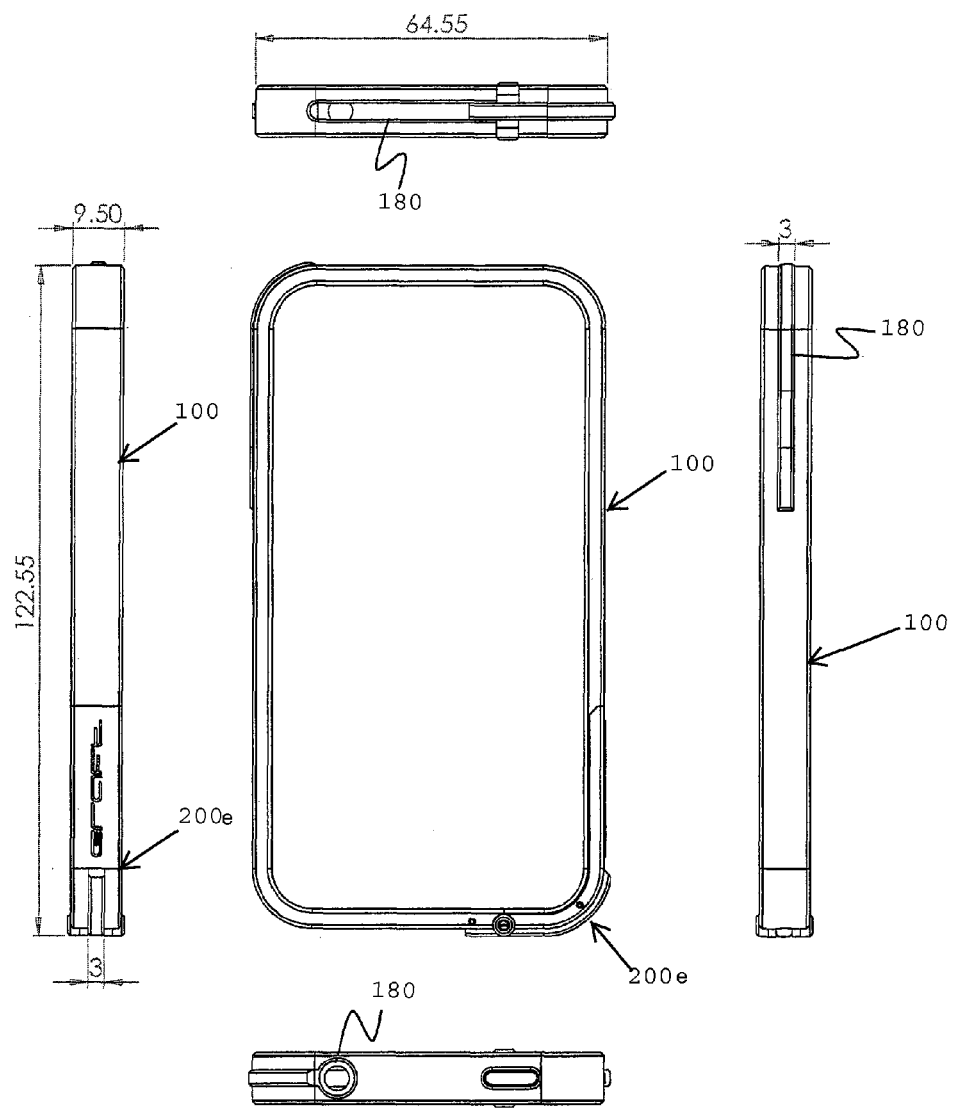

FIG. 6 various views of a mobile device according to an embodiment of the invention.

Figure 7:
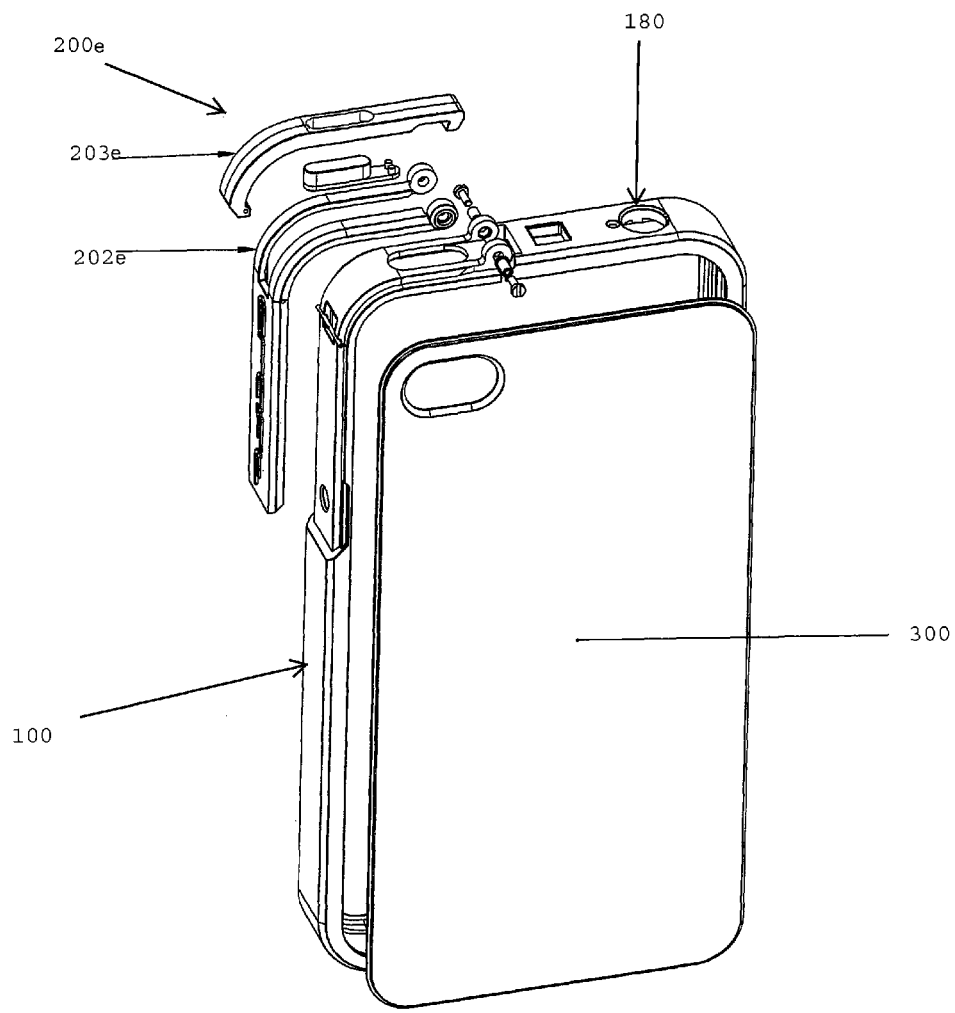

FIG. 7 shows an exploded view of a protective case for a mobile device according to an embodiment of the invention.

Figure 8:
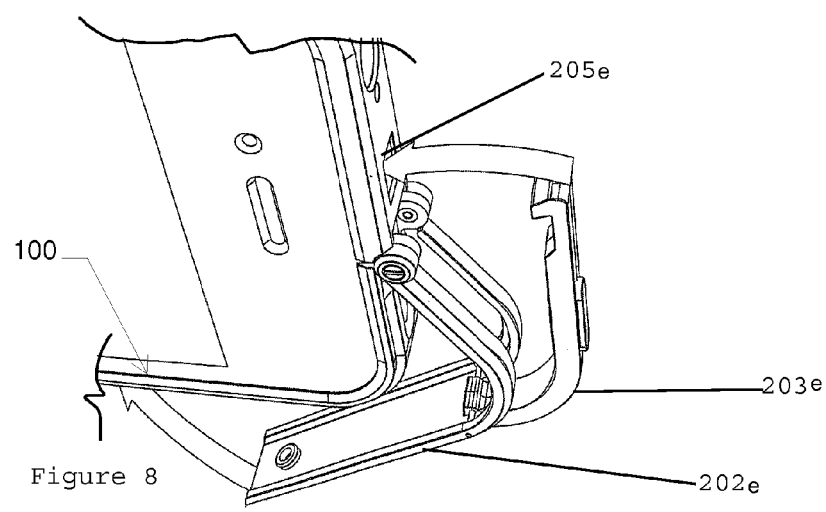
Figure 9:
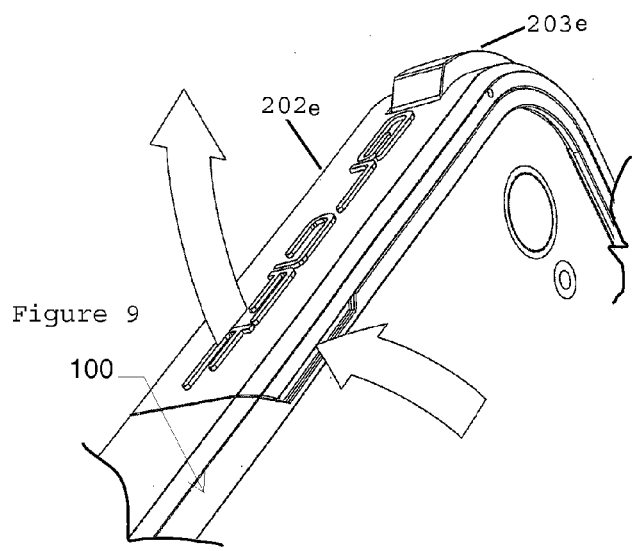
Figure 10:
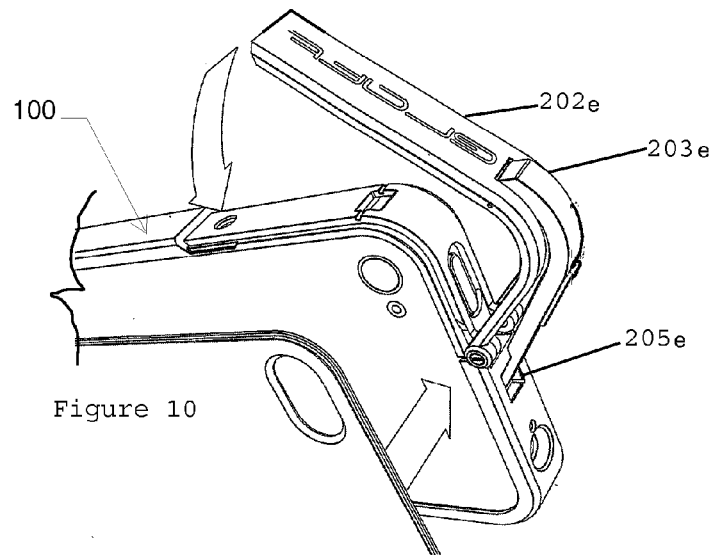

FIG. 8-10 shows transitional views of a protective case for a mobile device according to an embodiment of the invention.

Figure 11:
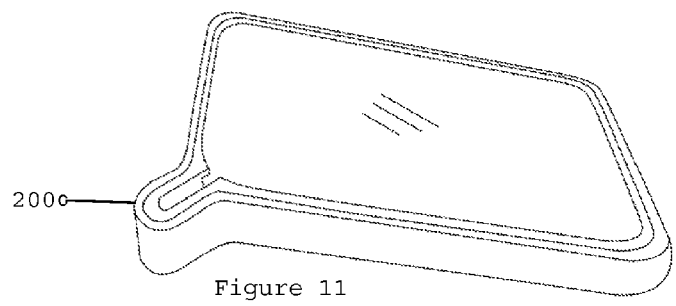

FIG. 11 shows a protective case for a mobile device according to an embodiment of the invention.

Figure 12:
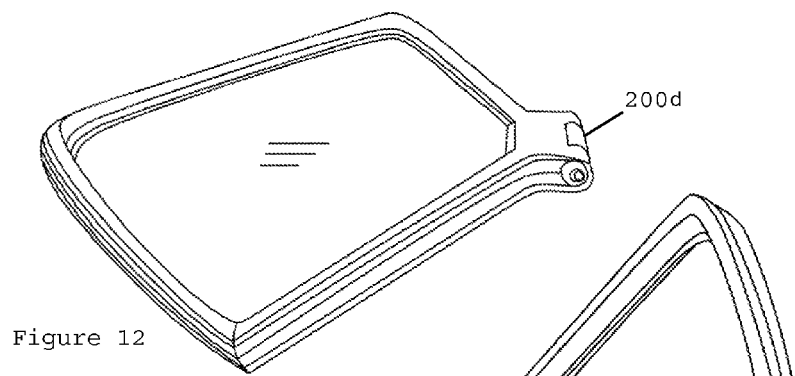
Figure 13:
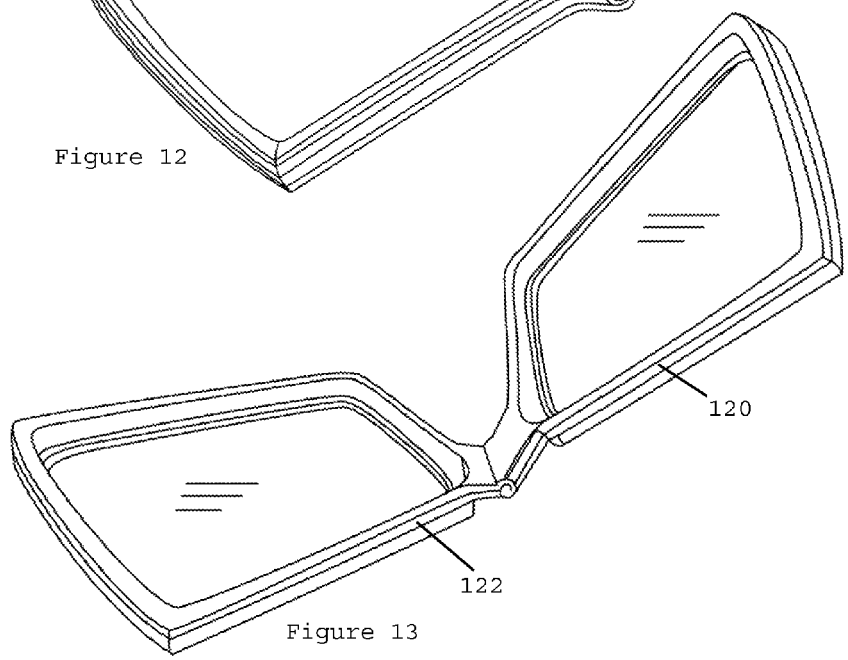

FIG. 12-13 shows a protective case for a mobile device according to an embodiment of the invention.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

FIGS. 1-10 illustrate a protective casing according to at least one preferred embodiment comprising: a frame 100 and an actuator 200 (for example, actuators 200a, 200b, 200c, 200d, and 200e).

The frame 100 may be operable to enclose the periphery of the handheld device and secure the device therein. Specifically, the frame comprises a diameter that is the largest distance between opposing sides of the frame. The actuator 200 is integral to the frame and causes the frame to be in at least one of an open position and a closed position. The closed position is shown, for example, in FIG. 1; the open position is shown, for example, in FIG. 2. While in the open position, the frame diameter is expanded, allowing for the handheld device to be inserted between the opposing sides of the frame. While in the closed position, the frame diameter is contracted so that the periphery of the handheld device is enclosed by the frame, and the device is held securely within. While in the closed position, the handheld device is secured by the frame so as to substantially reduce sheer movement between the frame and the handheld device.

Figures 1, 2:
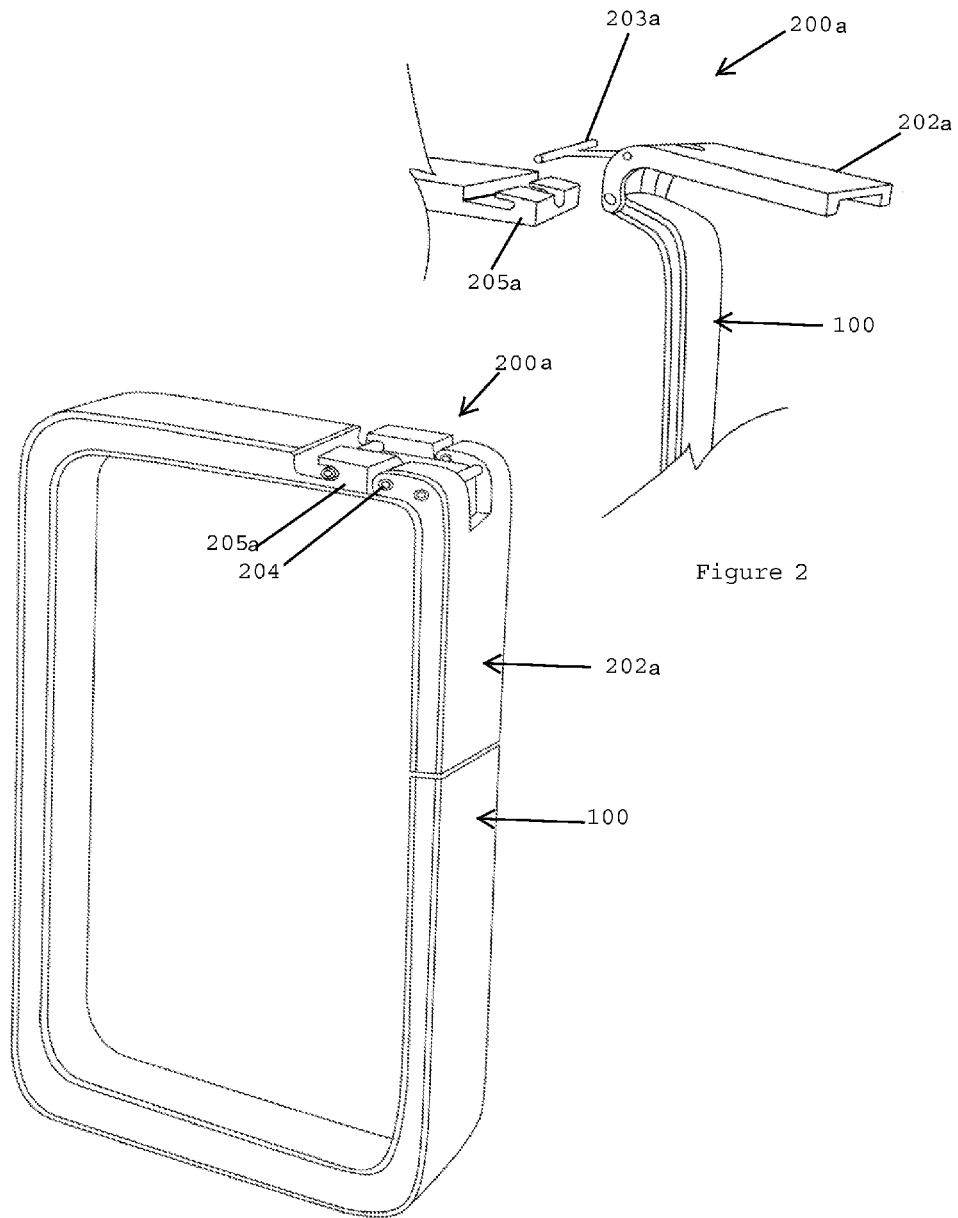
FIG. 1-2 shows a protective case for a mobile device according to an embodiment of the invention.
Figures 3, 4:
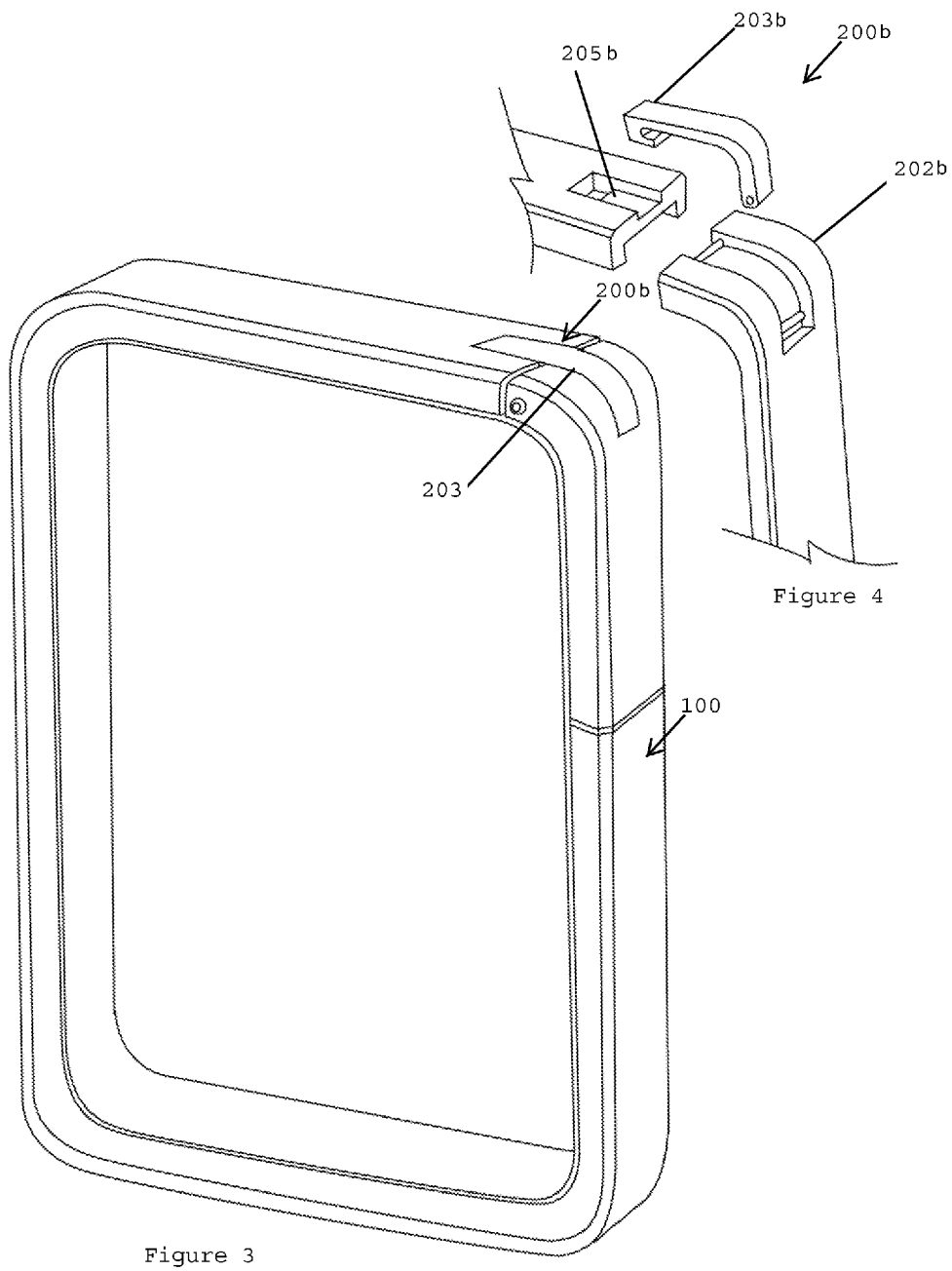
FIGS. 3-4 shows a protective case for a mobile device according to an embodiment of the invention.

The actuator may comprise a latch 203 (for example, latches 203a, 203b, 203c, 203d, and 203e) hingedly attached to a lever 202 (for example, actuators 202a, 202b, 202c, 202d, and 202e). The latch may extend from the lever to engage the frame at a latch point 205 (for example, latch points 205a, 205b, 205c, 205d, and 205e) located on the frame. The latch point is preferably a grove or aperture having an edge that engages the latch and secures it therein. As shown in FIGS. 1-2, in at least one embodiment, the latch comprises a T-shaped latch engageable to the latch point. As shown in FIGS. 3-4, in at least one embodiment, the latch comprises a C-shaped latch engagable to the latch point.

As shown in FIGS. 1-4, the latch may be hingedly coupled to the lever via a first pin, and the lever may be hingedly coupled to the frame via a second pin such that movement of the lever about the second pin causes the latch to transition between being engaged with the frame to being disengaged with the frame. The lever also preferably engages the frame when in the closed position so as to be substantially flush therewith. Thus, the casing preferably has a unitary appearance, or one without protrusions. This is further illustrated in FIGS. 8-10, which illustrate various stages of the actuator causing the frame to transition between the open position and the closed position.

In at least one embodiment, as shown in FIG. 11, the actuator comprises a flexible tab 200 integral to the frame and extending therefrom. The tab may be formed so as to permit the frame to expand to the open position and to contract to the closed position. Specifically, the tab preferably permits slight flexion at each corner of the frame in response to an outward force, the flexion causing the diameter of the frame to expand. Furthermore, the tab and frame are preferably elastic, so that the tab and frame return to a closed position on the cessation of the force.

In at least one embodiment, as shown in FIGS. 12-13, the frame comprises a bifurcated frame comprising a first frame segment 120 and a second frame segment 122. The actuator may comprise a hinge 200 coupling the first frame segment to the second frame segment. The hinge may permit movement of the first frame segment relative to the second frame segment so as to cause the frame to be in one of the open position and the closed position. The open position may permit the insertion of the handheld device. The closed position may secure the handheld device within the frame and substantially prevent removal.

In at least one embodiment, the actuator may comprise a coupling section. The coupling section may engage the frame at at least one post of the frame. At least one fastener, preferably Allen screws, engage the coupling section. The tightening of the fastener exert pressure on the post, causing the post to deform. The deformation of the post wedges the post into the frame so as to secure the frame to the coupling section thereby causing the frame to be in a closed position.

The frame may comprise a substantially elastic inner membrane and a substantially inelastic outer shell. The inner membrane engages the periphery of the handheld device and secures it within the frame. The combination of the inner membrane and the outer shell provides protection against dropping, scratching, or otherwise damaging the handheld device.

As shown in FIG. 7, the protective casing may further comprise at least one insert 300. This insert is preferably planar insert, but may be non-planar or web-like as well. The insert may form at least one of a back plate and a face plate for the casing. The insert may be of transparent or opaque material. The frame may be operable enclose the periphery of the insert secure the insert therein. Alternatively, the insert may be integral to the frame, forming a unitary structure therewith.

Figure 5:
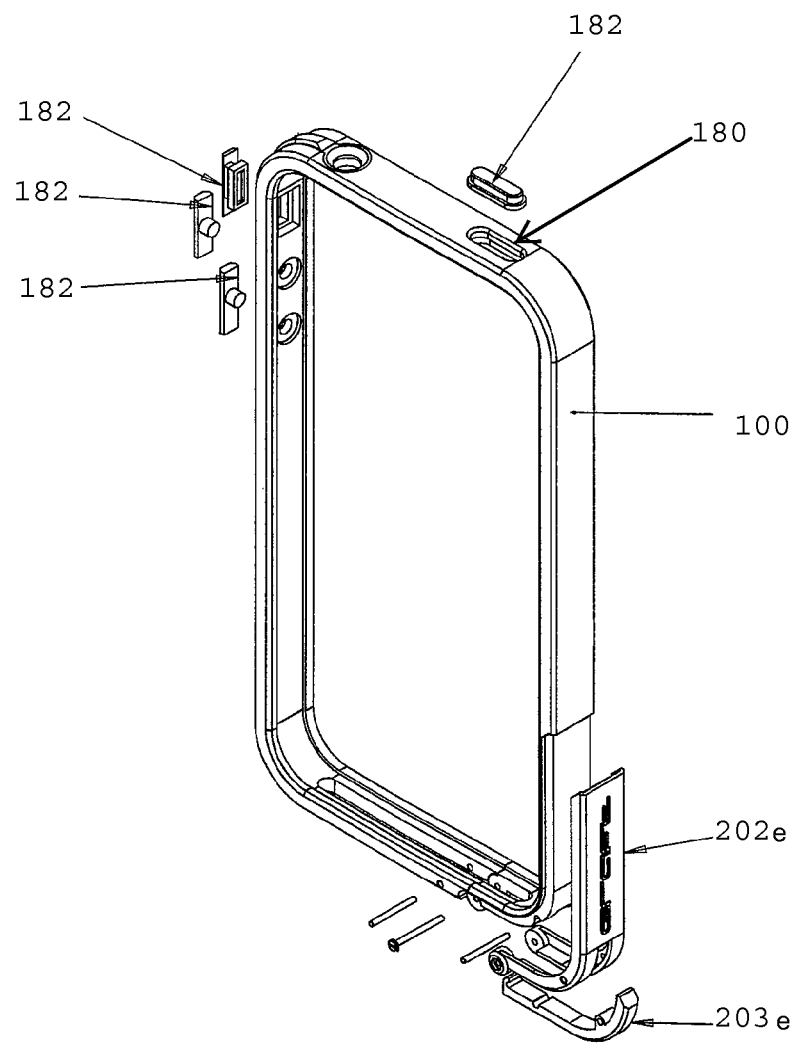
FIG. 5 shows an exploded view of a protective case for a mobile device according to an embodiment of the invention.

As shown in FIG. 5, the casing may further comprise at least one aperture 180 whereby a user interface of the handheld device is accessible. Such interfaces may include a volume control, a headphone jack, a power control, a ringer on/off control, or any other interface present on the handheld device. The aperture may be located on at least one of: the frame and the actuator. There may be a peg 182 associated with the aperture, the peg engaging the aperture and enabling user operation of the associated interface. For example, one aperture and peg may be associated with the power button of the handheld device such that pressing the peg causes the power button to be pressed.

In some embodiments, the frame is constructed of at least one of: wood, rubber, plastic and metal. In some embodiments, the actuator is constructed of a strong durable metal such as titanium, stainless steel, aluminum, alloys and metal plating. In some embodiments the insert is constructed of at least one of: wood, rubber, plastic, metal, and glass.

Returning to FIGS. 1-3, the iPhone 4 protective case preferably comprises of a lever 202 that operates a latch 203. The latch and lever are fabricated in a strong, non-brittle material such as aluminum or steel. Pins and hinges 204 pivotally secure the latch and lever to the main case body 100. Along with offering ornamental and styling features to the phone case, the latch and lever provide a method to securely tighten the case around the iPhone4, thus eliminating the play that is often found in other iPhone cases of similar design.

The frame of the main case body is constructed of a strong durable material such as plastic, wood, or metal. A split in main body allows the body to expand slightly to allow for ease of removal or addition of the mobile phone.

A groove that runs along the inside face of the body of the case ensures proper alignment of the mobile phone. It enables the external buttons 182 of the case to precisely line up with the buttons on the mobile phone. The buttons on the case can be actuated to activate the buttons on the phone. A movable switch corresponds to the audible/silent switch on the iPhone 4. This switch can be reversed based on if the user prefers a default audible or silent option. The reversibility ensures a consistent styling and rectilinear alignment against the buttons. A button 182 activates the sleep/wake function on the iPhone. A cutout 180 corresponds to the position of the of the headphone jack. Further cutouts 182 are for the speaker, microphone and docking port. Further iterations may include a protective backing or cover.

FIGS. 12-13 show an embodiment of the invention where the case is bifurcated. A hinge joint 200 moveably connects a first segment 120 and a second segment 122 of the case. Each of the first and second segments are comprised of a soft inner membrane and a hard outer shell. Furthermore, the case comprises a window that may be glass, plastic, or the like, or that may be just an opening.

FIG. 11 shows an embodiment of the invention where the actuator comprises a tab 200. The tab allows for flexibility in the case frame and permits the mobile device to be inserted.

In at least one embodiment, a plastic frame is joined to a metal section by, for example, an Allen screw. The metal section surrounds a post on the plastic frame. By inserting the screw, the plastic expands and wedges itself into the metal section of the frame. A plastic frame has a metal element that connects to a fabric lanyard strap. The strap connects to the metal section of the case. The plastic case may have exposed screws that are used to connect it to the metal elements.

In at least one embodiment, the actuator comprises a tab. The tab may have a lanyard attached thereto. The tab may also be flexible material, permitting the mobile device to be inserted into the frame.

A system of interchangeable accessories (not shown) designed for a mobile device such as the iPhone 4 may also be provided. An attachment point for a mobile accessory, such as a headphone cord wrap, may be included. The attachment point may be attached to the mobile device with various methods including a suction cup, or with a case that splits, allowing for the easy removal of mounting point and accessory. A tripod accessory and a combination belt clip and headphone wrap are conceived. A headphone cord management structure may be integrated into the mobile media device case. The structure may utilize a groove around the perimeter of the case to hold headphone cables in place.

A protective case may also be provide, comprising a front and rear surface. The mobile device may be completely enclosed within the case. As with other embodiments, the case may be constructed of both soft materials and hard materials.

A case may also be provided that acts as a support stand. In one embodiment, the case, is able to fully encloses the mobile device. In one embodiment, the case enables the mobile device to change a support angle. The casing may comprise a stylus receptacle.

The case may be operable as a support in various forms including a tentacled character, a toy bear, and/or a character with its face represented in an application residing on a smart phone. The stand may comprise a simplified human form with a face that is represented within a smart phone application. Variations in device orientation as well as animal forms are possible.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A protective casing for a mobile phone, the casing comprising:
    a frame operable to enclose the entire periphery of the phone immediately adjacent thereto so as to secure the phone therein by contact;
    an actuator integral to the frame, the actuator selectively permitting the insertion and removal of the phone with respect to an interior space defined by the frame; and
    at least one planar insert;
    wherein the frame encloses the entire periphery of the insert immediately adjacent thereto so as to secure the insert therein by contact; and
    wherein the actuator selectively permits the insertion and removal of the insert with respect to the interior space; wherein the insert and the frame in combination form a plane and the actuator rotates parallel to the planed formed by the insert and the frame; and wherein the actuator comprises: a latch hingedly affixed to the lever and extending therefrom to engage the frame at a latch point so as to secure the frame in a closed position, the liver hingedly affixed to the frame and operable to engage the frame so as to be substantially flush therewith.

2. The casing of claim 1, wherein the casing further comprises an aperture whereby a button of the handheld device is accessible therethrough.

3. The casing of claim 1, wherein the frame is constructed of at least one of: wood, rubber, plastic and metal.

4. The casing of claim 1, wherein the actuator is constructed of metal.

5. The casing of claim 1, wherein the insert is constructed of at least one of: wood, rubber, plastic, metal, and glass.

* * * * *